United States Patent
Bruce et al.

(10) Patent No.: US 10,621,556 B2
(45) Date of Patent: Apr. 14, 2020

(54) ENHANCED CONTENT INTEREST AND CONSUMPTION COMMUNITIES

(71) Applicant: International Business Machines Corporation, Armonk, NY (US)

(72) Inventors: Edwin J. Bruce, Corinth, TX (US);
Christina I. Flores, Keller, TX (US);
Romelia H. Flores, Keller, TX (US);
Matthew M. Rocco, Irving, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 772 days.

(21) Appl. No.: 14/953,826

(22) Filed: Nov. 30, 2015

(65) Prior Publication Data
US 2017/0154317 A1 Jun. 1, 2017

(51) Int. Cl.
*G06Q 10/10* (2012.01)
*H04L 29/06* (2006.01)
*G06Q 50/00* (2012.01)
*G06Q 10/06* (2012.01)
*G06Q 30/02* (2012.01)

(52) U.S. Cl.
CPC ......... *G06Q 10/1097* (2013.01); *G06Q 50/01* (2013.01); *H04L 67/42* (2013.01); *G06Q 10/063114* (2013.01); *G06Q 30/0261* (2013.01)

(58) Field of Classification Search
CPC ....... G06Q 10/1097; G06Q 10/063114; G06Q 30/0261; G06Q 50/01; H04L 67/42
USPC ...................................................... 705/7.21
See application file for complete search history.

(56) References Cited

U.S. PATENT DOCUMENTS

| | | | |
|---|---|---|---|
| 8,892,630 B1 | 11/2014 | Curtis | |
| 9,002,977 B2 | 4/2015 | Thaxter et al. | |
| 9,069,332 B1* | 6/2015 | Gayles | G04F 10/00 |
| 9,760,254 B1* | 9/2017 | Donnelley | G06F 17/2229 |
| 2004/0122693 A1 | 6/2004 | Hatscher et al. | |
| 2009/0070128 A1 | 3/2009 | McCauley et al. | |
| 2009/0070426 A1 | 3/2009 | McCauley et al. | |
| 2009/0156310 A1* | 6/2009 | Fargo | A63F 13/12 |
| | | | 463/42 |
| 2010/0030565 A1* | 2/2010 | Holt | G06Q 10/063114 |
| | | | 705/7.15 |

(Continued)

OTHER PUBLICATIONS

Nathan Eagle et al. Social Serendipity: Proximity Sensing and Cueing. MIT Media Laboratory Technical Note 580, May 2004.*

(Continued)

*Primary Examiner* — Timothy Padot
(74) *Attorney, Agent, or Firm* — Cuenot, Forsythe & Kim, LLC (57) ABSTRACT

Natural language processing is performed on social media system posts by a plurality of users of a reading community. Corresponding analytical data is generated. Respective interests of the plurality of users can be determined by processing the analytical data. A present location of at least two users of the reading community can be monitored. Responsive to determining that the users are presently located within a pre-determined distance of each other, respective alerts can be presented to those users. Each alert can indicate that the users are presently located within the pre-determined distance of each other, indicate a listing of content being read by the reading community, and indicate a shared interest of the users.

15 Claims, 4 Drawing Sheets

(56) References Cited

U.S. PATENT DOCUMENTS

| | | | | |
|---|---|---|---|---|
| 2010/0312605 | A1* | 12/2010 | Mitchell | G06Q 10/06 705/7.13 |
| 2012/0095862 | A1* | 4/2012 | Schiff | G06Q 30/06 705/26.7 |
| 2014/0067828 | A1* | 3/2014 | Archibong | H04N 21/23424 707/748 |
| 2014/0082016 | A1* | 3/2014 | Vanek | G06Q 10/10 707/770 |
| 2014/0315163 | A1* | 10/2014 | Ingrassia, Jr. | G09B 17/003 434/169 |
| 2014/0365313 | A1 | 12/2014 | Reese et al. | |
| 2015/0052202 | A1 | 2/2015 | Lang | |
| 2015/0186947 | A1* | 7/2015 | Huang | G06Q 30/0269 705/14.66 |
| 2016/0117067 | A1* | 4/2016 | Ghosh | G06F 3/0483 715/753 |
| 2016/0149864 | A1* | 5/2016 | Flawn | G06F 16/93 726/22 |
| 2016/0357253 | A1 | 12/2016 | Abraham et al. | |

OTHER PUBLICATIONS

Alvin Chin et al. Who should I add as a "friend"?: a study of friend recommendations using proximity and homophily. In Proceedings of the 4th International Workshop on Modeling Social Media (MSM '13). May 1, 2013. ACM, New York, NY, USA, Article 7, 7 pages.*

* cited by examiner

```
┌─────────────────────────────────────────────────────────────────────┐
│  Schedule, within a scheduling system of a content interest system, │
│  a desired completion time by which a plurality of users in a       │
│  community are to have completed reading or viewing content         │
│                              305                                    │
└─────────────────────────────────────────────────────────────────────┘
                                  │
                                  ▼
┌─────────────────────────────────────────────────────────────────────┐
│  Monitor, using a processor, for each of the plurality of users, a  │
│  rate of progression of the user at reading or viewing the content  │
│                              310                                    │
└─────────────────────────────────────────────────────────────────────┘
                                  │
                                  ▼
┌─────────────────────────────────────────────────────────────────────┐
│ Responsive to detecting that at least one of the plurality of users │
│ is not adequately progressing, at the rate of progression of the    │
│ user, at reading or viewing the content to complete reading or      │
│ viewing the content by the desired completion time, present an      │
│ alert to the user or an administrator indicating that the user is   │
│ not adequately progressing at reading or viewing the content        │
│                              315                                    │
└─────────────────────────────────────────────────────────────────────┘
```

ENHANCED CONTENT INTEREST AND CONSUMPTION COMMUNITIES

BACKGROUND

The present invention relates to data processing systems, and more specifically, to data processing systems that facilitate interaction among people having a shared interest.

Social reading groups, commonly referred to as book clubs, have existed in the American culture for more than a century, and the number of people participating in social reading groups continues to increase. It is estimated that currently there are more than six million Americans participating in book clubs, up from five million estimated to have participated in book clubs in the year 2011. The manner in which members of book clubs interact with one another has changed little over the years.

SUMMARY

A method includes performing, using a processor, natural language processing on social media system posts by a plurality of users of a reading community and generating corresponding first analytical data. The method also can include determining respective interests of the plurality of users by processing the first analytical data. The method also can include monitoring, by processing global positioning system data, a present location of at least two of the plurality of users of the reading community. The method also can include, responsive to determining that the at least two of the plurality of users of the reading community are presently located within a pre-determined distance of each other, presenting respective alerts to the at least two of the plurality of users, each alert indicating that the at least two of the plurality of users in the reading community are presently located within the pre-determined distance of each other, indicating a listing of content being read by the reading community, and indicating a shared interest of the at least two of the plurality of users.

A system includes a processor programmed to initiate executable operations. The executable operations include performing natural language processing on social media system posts by a plurality of users of a reading community and generating corresponding first analytical data. The executable operations also can include determining respective interests of the plurality of users by processing the first analytical data. The executable operations also can include monitoring, by processing global positioning system data, a present location of at least two of the plurality of users of the reading community. The executable operations also can include, responsive to determining that the at least two of the plurality of users of the reading community are presently located within a pre-determined distance of each other, presenting respective alerts to the at least two of the plurality of users, each alert indicating that the at least two of the plurality of users in the reading community are presently located within the pre-determined distance of each other, indicating a listing of content being read by the reading community, and indicating a shared interest of the at least two of the plurality of users.

A computer program includes a computer readable storage medium having program code stored thereon. The program code is executable by a processor to perform a method. The method includes performing, by the processor, natural language processing on social media system posts by a plurality of users of a reading community and generating corresponding first analytical data. The executable operations also can include determining respective interests of the plurality of users by processing the first analytical data. The executable operations also can include monitoring, by processing global positioning system data, a present location of at least two of the plurality of users of the reading community. The executable operations also can include, responsive to determining that the at least two of the plurality of users of the reading community are presently located within a pre-determined distance of each other, presenting respective alerts to the at least two of the plurality of users, each alert indicating that the at least two of the plurality of users in the reading community are presently located within the pre-determined distance of each other, indicating a listing of content being read by the reading community, and indicating a shared interest of the at least two of the plurality of users.

DETAILED DESCRIPTION

This disclosure relates to data processing systems, and more specifically, to data processing systems that facilitate interaction among people having a shared interest. In accordance with the inventive arrangements disclosed herein, a content interest system can facilitate and enhance connectivity among users having shared interests in various content (e.g., books, movies, and the like). In this regard, users and/or administrators can form communities for users having shared interests, and each user can join one or more of the communities to interact with other users who also are members of the community/communities. For example, the users can share notes or comments relating to content and the like, in real time. The content interest system also can provide intelligent scheduling for reading or viewing content, location based services to facilitate the bringing together of users who are located proximate to one another, a knowledge corpus to implement a variety of different automated functions using natural language processing, and user incentives to participate in the content interest system.

Several definitions that apply throughout this document will now be presented.

As defined herein, the term "content" means text, audio, video and/or a combination of text, audio and/or video (e.g., multimedia). For example, content can be a book, a movie, or the like. A book may be a printed book and/or an electronic version of a printed book (e.g., e-book) configured to be read on a client device.

As defined herein, the term "community" means a defined group of users each having interest in particular content or types of content.

As defined herein, the term "feedback" means notes or comments pertaining to content.

As defined herein, the term "client device" means a processing system including at least one processor and memory that requests shared services from a server (e.g., to download and/or present content), and with which a user directly interacts. Examples of a client device include, but are not limited to, a workstation, a desktop computer, a mobile computer, a laptop computer, a netbook computer, a tablet computer, a smart phone, a digital personal assistant, an electronic reading device specifically configured to present content (e.g., an e-reader), a smart watch, smart glasses, a gaming device, a set-top box, a television, and the like. Network infrastructure, such as routers, firewalls, switches, and the like, are not client devices as the term "client device" is defined herein.

As defined herein, the term "social media system" means a system that provides one or more social media services, for instance via one or more websites. A social media service is an online service platform on which social networks or social relations are built among people who, for example, share interests, activities, backgrounds or real-life connections, and via which people can share information with one another.

As defined herein, the term "news system" means a system that provides news information via one or more websites, news feeds or social media systems.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process to continue or a determination to be made, or that enables the processor to keep up with some external process.

As defined herein, the term "output" means storing in memory elements, writing to a display or other peripheral output device, sending or transmitting to another system, exporting, or the like.

As defined herein, the term "automatically" means without user intervention.

As defined herein, the term "user" means a person (i.e., a human being).

As defined herein, the term "administrator" means a user having administrative privileges.

As defined herein, the term "author" means a user that creates content subject to being shared with other users.

As defined herein, the term "publisher" means a user that publishes content for sharing with other users.

Figure 1:
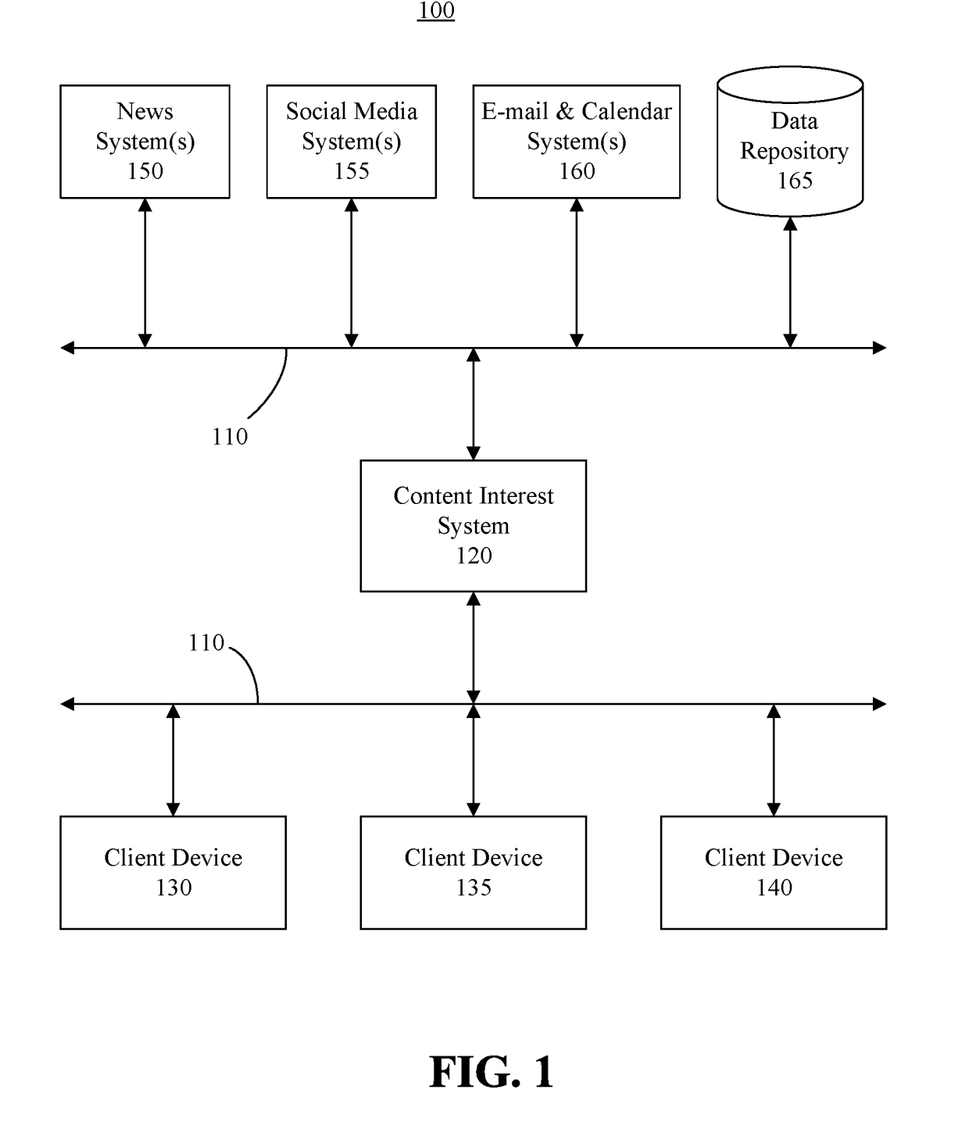
FIG. 1 is a block diagram illustrating an example of a network data processing system.

FIG. 1 is a block diagram illustrating an example of a network data processing system 100. The network data processing system 100 contains at least one communication network 110. The communication network 110 is the medium used to provide communications links between various devices and data processing systems connected together within network data processing system 100. The communication network 110 may include connections such as wires, wireless communication links, or fiber optic cables. The communication network 110 may be implemented as, or include, any of a variety of different communication technologies such as a Wide Area Network (WAN), a Local Area Network (LAN), a wireless network, a mobile or cellular network, a Virtual Private Network (VPN), the Internet, the Public Switched Telephone Network (PSTN), or the like.

The network data processing system 100 also can include a content interest system 120 and a plurality of client devices 130, 135, 140, each of which may couple to the communication network 110. The content interest system 120 may be implemented as one or more data processing systems (e.g., servers), each including at least one processor and memory, executing suitable operational software to perform various processes described herein that are performed by the content interest system 120. Each client device 130-140 can include a web browser and/or application configured to interface with the content interest system 120 via the communication network 110 to perform various processes described herein that are performed by the client devices 130-140.

Optionally, the network data processing system 100 can include one or more news systems 150, one or more social media systems 155, one or more e-mail and calendar systems 160 and one or more data repositories 165 external to the content interest system 120 coupled to the network 110. The content interest system 120 can receive news content from the news system(s) 150, social media content, messages and/or posts from the social media system(s) 155, and e-mails and/or calendaring information from the e-mail and calendar system(s) 160. The content interest system 120 also can access various data from the data repository 165. Further, the content interest system 120 can communicate to the news system(s) 150 news generated by users of the client devices 130-140 or the content interest system 120, which the news system 150 can share with other people/client devices. The content interest system 120 also can communicate to the social media system(s) 155 content, messages and/or posts, which the social media system 155 can post and/or share with other people/client devices. The content interest system 120 also can communicate to the e-mail and calendar system(s) 160 e-mails and calendar information, which the e-mail and calendar system 160 can communicate to other people/client devices. Moreover, the content interest system 120 can communicate data to the data repository(ies) 165, which the data repository 165 may store.

Figure 2:
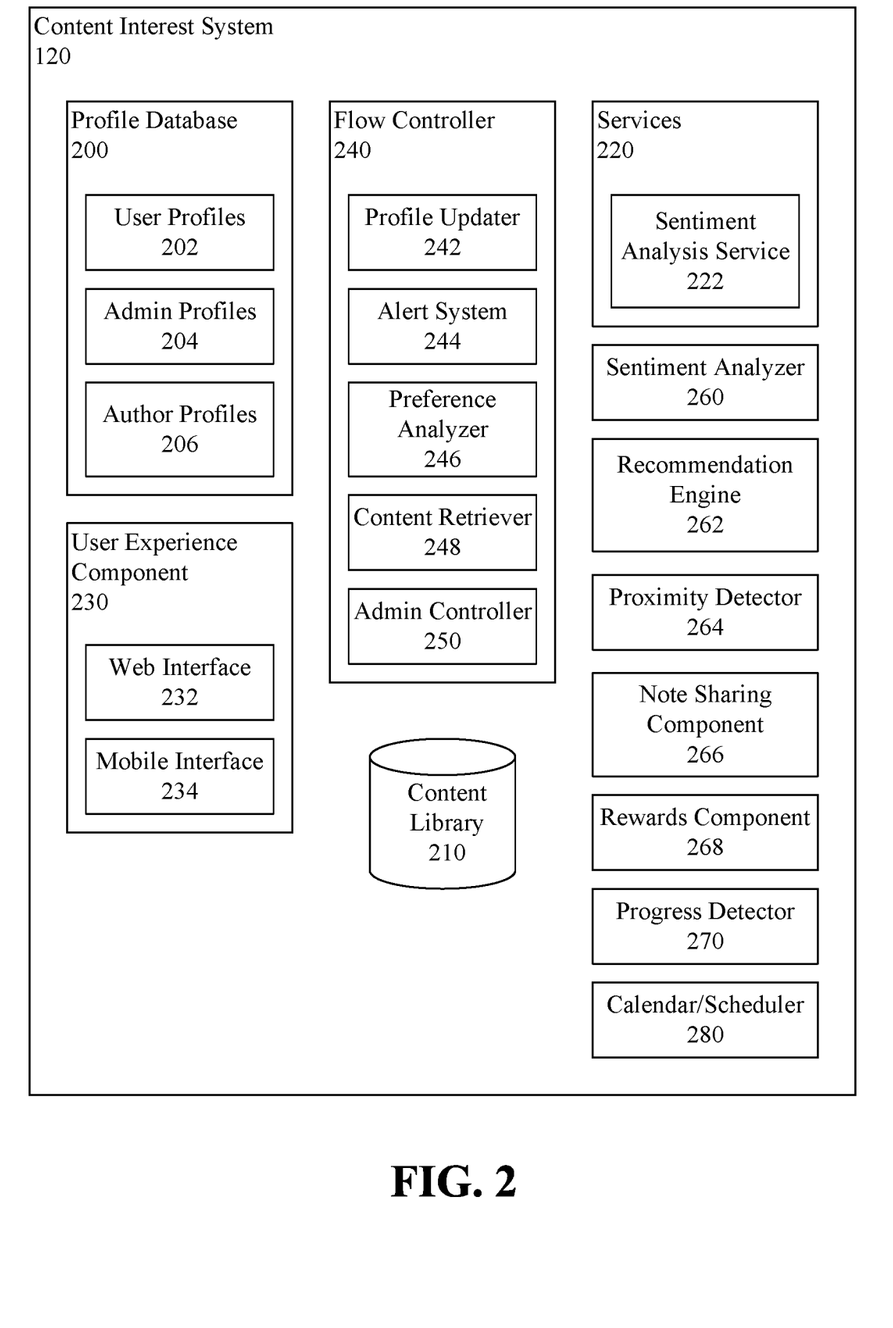
FIG. 2 is a block diagram illustrating an example configuration for a content interest system.

FIG. 2 is a block diagram illustrating an example configuration for the content interest system 120.

The content interest system 120 can include a profile database 200, which the content interest system 120 may store locally to a computer readable storage medium within, or coupled to, the content interest system 120, or store to an external computer readable storage system, for example, the data repository 165. Within the profile database 200, the content interest system 120 can store user profiles 202 for general users of the content interest system 120, administrator profiles 204 for administrators of the content interest system 120, and author (and/or publisher) profiles 206 for authors or publishers that contribute content read and/or viewed by the users.

A general content interest system 120 user can be, for example, a user that is not an administrator or author, but is provided authorization to join and/or form one or more communities (i.e., groups) within the content interest system 120. For instance, a general user can join and/or form one or more book or media club communities. An administrator can be, for example, a user who is assigned responsibility for managing one or more communities within the content interest system 120. For example, an administrator can add or subtract general users from one or more communities, specify other administrators, maintain community information, or the like. Maintaining community information can include, for example, maintaining information related to which books or multimedia are to be, or are actively being, read or viewed, which purchases and/or content acquisitions are to be made, etc. An administrator also can be provided authorization to join and/or form one or more communities within the content interest system 120. An author or publisher can be a content originator whose content offerings are of interest to general users and/or administrators of the content interest system 120. An author or publisher can, for example, provide content (e.g., one or more books or multimedia) into a content library 210 for access by general users and administrators. In addition, an author or publisher can receive sentiment analysis data pertaining to general user and/or administrator sentiment regarding their content. The sentiment analysis data can be provided by a sentiment analysis service 222, which can be one or a plurality of services 220 provided by the content interest system 120.

Each profile in profile database 200 can include basic profile information for a respective user, administrator or author (or publisher). Some information may be required, while other information may be optional. Examples of profile information include, but are not limited to, name, age, gender, education level, occupation, location of residence or work (e.g., town, city, state, country, etc.) and other demographic information. In one aspect, profile information can be obtained through external resources, for example, one or more social media systems 155. Profile information can also be obtained by other components within the content interest system 120, such as sentiment analyzer 260 and/or recommendation engine 262, which will be described herein.

The content interest system 120 can include the content library 210, which the content interest system 120 may store locally to a computer readable storage medium within, or coupled to, the content interest system 120, or store to an external computer readable storage system, for example, data repository 165. The content library can be implemented as a database containing content (e.g., books and/or multimedia) for use by users and administrators of the content interest system 120. Content can be added to the content library 210 by administrators, authors and/or publishers. The content library 210 can also be augmented with notes and/or comments provided by various users of the content interest system 120, for example via a note sharing component 266, which will be described.

The content interest system 120 can include a user experience component 230. The user experience component 230 can include a web interface 232 and a mobile interface 234. The web interface 232 can be configured to host user sessions established by web browsers of the client devices 130-140 via the communication network 110. For example, the web interface 232 can provide web pages to the web browsers and receive from the web browsers data entered by users. The web interface 232 also can present to users alerts generated by the content interest system 120, which will be described. The mobile interface 234 can be configured to host user sessions established by mobile applications of the client devices 130-140 via the communication network 110. For example, the mobile interface 234 can provide pages to the mobile applications and receive from the mobile applications data entered by users. The mobile interface 234 can also present to users alerts generated by the content interest system 120.

The content interest system 120 can include a flow controller 240. The flow controller 240 can include a profile updater 242, an alert system 244, a preference analyzer 246, a content retriever 248 and an administrative controller 250.

The flow controller 240 can manage the flow of data between various components of the content interest system 120, for example data communicated between the user experience component 230 and other components of the content interest system 120. The profile updater 242 can create, retrieve, update and delete the user profiles 202-206, as well as information contained in the user profiles 202-206.

The alert system 244 can include push notification facilities responsible for sending alert messages to users. Notification events may be triggered by different actions or circumstances, such as calendar events, users being within proximity of one another, changes within communities defined in the content interest system 120, updates pertinent to content or the communities/groups, etc.

The preference analyzer 246 can analyze various data to determine user or community preferences. The various data can include, for example, sentiment analysis data generated by the sentiment analyzer 260 and user progress data generated by progress detector 270. Thus, an individual user can view their own preferences as well as preferences of communities/groups in which the user is a member.

Further, responsive to joining the content interest system 120, the user can create a user profile 202. The preference analyzer 246 can analyze the user profile to identify other content interest system 120 users having the same interests and/or the same demographics (e.g., age, gender, education, occupation, etc.) as the new user, and in which communities those other users are members. Such communities may also be of interest to the new user. The preference analyzer 246 can present information to the new user via the user experience component 230, indicating those other communities and recommending that the new user consider joining one or more of those communities.

In one arrangement, when initiating a process to join the content interest system 120, a user can authorize the content interest system 120 to access external information relevant to the user, for example from the social media system(s) 155 and/or the e-mail and calendar system(s) 160. In response, the preference analyzer 246 can obtain information from the social media system(s) 155 and/or e-mail and calendar system(s) 160 that is relevant to the user, for example, comments by the user from one or more posts in the social media system(s) 155 or entries into one or more calendar system(s) 160 regarding events the user is attending or has attended. The preference analyzer 246 (or another component of the content interest system 120) can perform natural language processing (NLP) and semantic analysis on the retrieved social and calendaring information to identify sentiments, interests and demographics for the user, and to generate and output analytical data. Based on the analytical data, the preference analyzer 246 can identify communities that may be of interest to the user, and can indicate those communities to the user. The overall goal would be to discover and match the user's characteristics with community options likely to develop the most synergy with the user and provide user satisfaction.

NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) publishes standards for NLP, one such standard being ISO/TC37/SC4. Semantic analysis is the implementation of computer processes to generate computer-understandable representations of natural language expressions. Semantic analysis can be used to construct meaning representations, semantic underspecification, anaphora resolution, presupposition projection and quantifier scope resolution, all of which are known in the art. Semantic analysis is frequently used with NLP to derive computer-understandable meaning from natural language input.

The content retriever 248 can update and maintain content within the content library 210 for individual users and for communities/groups within content interest system 120. The content retriever 248 can provide to users convenient, real time access to content stored in the content library 210 for which the users are authorized to access. Further, the content retriever 248 can synchronize notes and comments (e.g., annotations) made by users regarding content both at the individual user and community level. For example, a user in a group may add notes or comments to an electronic book the user is reading. The user can specify whether those notes or comments may be shared with other users in the group. If the user has specified that those notes or comments may be shared, the content retriever 248 can synchronize the notes or comments, in real time, with the copies of the electronic book that other users are reading. Thus, the other users can receive the notes or comments, in real time, without having to log into the content interest system 120 or visit a community website.

The administrative controller 250 can regulate and handle administrator controls, and can update overall community information. The administrative controller 250 can ensure that only administrators are allowed to update and access certain information within their respective communities/groups, and that updates are shared with all users in the respective communities/groups.

As noted, the content interest system 120 can provide a plurality of services 220, including the sentiment analysis service 222. The content interest system 120 can offer the sentiment analysis service 222 to authors, publishers, and other interested parties in order to allow access to sentiment analysis results from social media, survey reports, and natural language processing for notes and comments within content (e.g., a book or multimedia unit). The content interest system 120 can provide accessibility to analytical data provided by the sentiment analysis service 222 via the web interface 232 and/or mobile interface 234 using one or more application programming interfaces (APIs) or services. The information provided by the sentiment analysis service 222 can be aggregated and/or classified based on demographics and characteristics pertaining to users represented within one or more communities/groups, subject to information release agreements. Authorized users can access the analytical data provided by the sentiment analysis service 222 to gain insight into content consumer attitudes and sentiments, as well as continued loyalties for books/multimedia, series, authors, publishers, and brands. This insight can help to drive present and future marketing actions and product directions, and help authors and publishers tailor customer experiences, for example, for users of the content interest system 120.

The sentiment analysis service 222 can receive sentiment data (e.g., sentiment analysis results) from the sentiment analyzer 260. The sentiment analyzer 260 can automatically parse user comments and notes within particular content, and analyze the comments and notes using NLP and semantic analysis in order to determine overall and specific sentiments towards the content, both for individual users and a collective community. The sentiment analyzer 260 can output resulting analytical data to the sentiment analysis service 222. Thus, the sentiment analysis service 222 can use the analytical data to provide in-depth sentiment analyses over particular books, authors, subjects, and genres to publishers or other authorized users.

Additionally, sentiment analyzer 260 can include a survey component which prompts users, via the user experience component 230, to give feedback on content read or viewed within their community, and to provide recommendations for which content they would like to see selected by community administrators for future activities. In one arrangement, the sentiment analyzer 260 also can receive information provided by external systems, such as the news system(s) 150, social media system(s) 155, and e-mail and calendar system(s) 160. The sentiment analyzer 260 can process the user feedback and other received information using NLP and semantic analysis to determine user/community sentiments toward content, and output resulting analytical data to the sentiment analysis service 222. The sentiment analyzer 260 also can output the analytical data to other components of the content interest system 120, such as the recommendation engine 262, which will be described.

In one arrangement, the sentiment analyzer 260 can output the analytical data to the calendar/scheduler 280 and/or the content library 210 to share the sentiment of users with other members of the community, for example as notes or comments. In illustration, the sentiment analyzer 260 can add notes or comments for particular content in the content library 210, and those notes or comments can be shared with users in the community in real time. Thus, the content interest system 120 can share with users in the community not only notes and comments that are generated via the content interest system 120, but also notes and comments that are posted by various users in the social media system(s) 155. Because the content interest system 120 can do so, users who desire to have their notes and comments shared both with the content interest system and the social media system(s) 155 need only post such notes and comments in the social media system(s) 155, and the content interest system 120 can automatically detect those notes and comments and share them with the community in real time. Of course, whether a particular user chooses to have that user's notes or comments posted in the social media system(s) 155 shared with the community can be based on user settings in the user's user profile 202.

The recommendation engine 262 can process analytical data received from the sentiment analyzer 260 to provide content recommendations to users, both at an individual user level and at a community level. Such recommendations, however, need not be based exclusively on the analytical data received from the sentiment analyzer 260. By way of example, the recommendation engine 262 can recommend content based on content previously read or viewed by users in a community, survey reports from other users who may or may not be members of the community, or other information. Further, the recommendation engine 262 can process information received from one or more of the external systems 150-160, for example, information related to fan groups and/or users' personal interests, to determine content to be recommended. When recommending content for a particular community, the recommendation engine 262 can base such recommendations on all users within that community. Additionally, analytical data received from the sentiment analyzer 260 can aid recommendation engine 262 in obtaining a more complete understanding of the content to recommend to the community.

The recommendation engine 262 also can be configured to analyze different interests and preferences of users within communities and coming from multiple sources (i.e., the external systems 150-160, the sentiment analyzer 260, survey reports, etc.) in order to recommend subgroups within communities based on various user interests and preferences. This can help to get formation of subgroups underway. A given user may belong to one or more subgroups, each of which may both diverge and converge with the completion of each new content piece to be read or viewed. For instance, assuming a community reads book A and a subgroup within the community responds with notes or comments that provide positive feedback pertaining to the book, while another subgroup responds with notes or comments that provide negative feedback pertaining to the book, in such a circumstance, the recommendation engine 262 can automatically provide a recommendation that the community break into subgroups A and B, with subsequent content recommendations to the subgroups differing between the subgroups A and B from that point on. Similarly, discussion points could be generated with the newly-discovered subgroup differentiations in mind, and subgroups might divide around those discussion points during a subsequent physical or virtual club/community meeting. In this regard, the recommendation engine 262 can identify divides among interests of different subgroups within a community, and respond by tailoring specific recommendations to the different subgroups.

The proximity detector 264 can provide, via the alert system 244, alerts to users to notify the users who are members of the content interest system 120 when they are located proximate to one another, for example, within a pre-determined distance of each other or located within a same structure or venue. In an illustration, the client devices 130-140 of the users can communicate to content interest system 120 global positioning system (GPS) data. Whether each client device 130-140 shares its GPS data with the content interest system 120, and whether each user chooses to receive proximity alerts can be based on user preferences stored in the user's user profile 202. Further, each user can specify in their respective user profile 202 whether the user chooses to receive an alert when any other user is a member of the content interest system 120 is located proximate to the user, only when users who are members of the same community in which the user is a member is located proximate to the user, or when certain users are located proximate to the user.

The proximity detector 264 can process the GPS data and identify circumstances when two or more users of a community are located proximate to one another. In response to identifying such a circumstance, the proximity detector 264 can identify such users and access their corresponding user profiles 202. Based on the user profiles 202, the proximity detector 264 can determine whether an alert should be generated. Responsive to determining that an alert should be generated, the proximity detector can generate respective alerts to each of the users in proximity to one another whose user profiles 202 indicate that they desire to receive such alerts. The alert system 244 can communicate the alerts to the users via the user experience component 230 to indicate to each user that the other users are presently located near them.

Not only can the alerts indicate to each user which other users are in their proximity (e.g., other users who have set user preferences to share such information), but also can provide a variety of other information, for example a listing of content being read or viewed by the community in which the users are members and notes/comments regarding the content. The information also can indicate shared interests among the users that are in proximity to one another. The information that is communicated in an alert can be based on the user profiles 202. For example, a user may set preferences in the user's user profile 202 indicating the type of information the user chooses to be presented when other users from the content interest system 120 or other users in the user's community within that are located proximate to the user. In an illustration, a user can choose to only be presented notes/comments from the other proximally located users, or alternatively, notes/comments from all users in their community.

The alerts generated by proximity detector 264 can serve to prompt users who are located proximate to one another to meet with one another. For example, if a user is browsing a bookstore and receives an alert from the content interest system 120 indicating another user of the user's community also is located in the bookstore, the user can seek out the other user and start a conversation related to content the community is collectively reading.

The content interest system 120 also can include a note sharing component 266. The note sharing component 266 can be configured to share notes/comments generated by users, for example as previously described. The notes/comments generated by a user can be shared with another particular user, a particular subgroup within a community, a particular community, or across a plurality of communities. Thus, the note sharing component 266 provides for easy and convenient communications throughout the content interest system 120.

Rules established by an administrator of a given community may allow for notes and comments generated by users in that community to be shared with other users of the community, subject to preference settings in the user profiles 202. In some cases, an administrator of the community may generate notes or comments to be shared with a community. Individual users can access the notes/comments that are shared, and toggle between the notes/comments to view the notes/comments the user chooses to view, regardless of whether the notes are generated by a general user or an administrator of the community. In one arrangement, the notes/comments presented to a user can be filtered based on the user's user profile 202. For example, a user may only desire to view notes/comments from friends of the user. The user's friends can be identified by the note sharing component 266 by processing the user profiles 202. The note sharing component 266 also can be configured to share notes/comments shared by authors and publishers. For example, via the note sharing component 266 authors and publishers can post special information for users of the content interest system 120 that is not otherwise made publically available, for example, certain clips or passages for upcoming, not yet released content. This can help to trigger discussions among the users, and even outside of the content interest system 120, to build interest in the content.

The content interest system 120 also can include a rewards component 268. The rewards component 268 can assign to users reward points based on various factors. The accumulation of reward points by users also allow the users to gain prestige in their community and with other communities. The rewards component 268 can store the reward points to a point database. The point database can include for each user one or more records indicating the reward points accumulated by the user, as well as other information, and the rewards component 268 can associate the records of each user with that user's user profile 202. The rewards component 268 can assign to each user reward points based on the user's productivity at progressing through content, for example, a particular book, a series of books or a series of movies. The rewards component 268 also can assign to each user reward points based on a number of significant comments made by the user relating to the content interest system 120, for example, comments the user contributed for particular content, comments the user contributed to the user's community, comments the user contributed to a plurality of communities, and the like. The rewards component 268 also can assign to users reward points for participating in community events or multi-community events.

Rules to be followed by the rewards component 268 for assigning reward points can be specified by one or more administrators. For example, the administrator of the user's community can specify a number of reward points to be assigned to each user for a particular level of progression through a book and timeliness of that progression, a number of reward points for comments made by the user regarding the book, a number of additional reward points for comments that initiated a beneficial discussion about the book, etc.

Based on the accumulation of reward points by a user over specified time frames, the rewards component 268 can provide various rewards to the user. For example, the rewards component 268 can reward the user with personal ownership of content formerly reserved to the community. The rewards component 268 also can provide various awards to the user's community. For example, if a user in a community, or the community as a whole, achieves a particular number of reward points within a specified time frame, the rewards component 268 can reward the entire community with complementary new content from authors, publishers and the like. Further, authors and publishers can offer rewards in the form of personal exchanges with users, or offer rewards to users in the form of early access to content before the content is otherwise made publically available. Authors and publishers also can provide to users chances to contribute candidate storyline twists for works of content currently in progress, or perhaps contribute alternative endings for works of fiction.

The content interest system 120 also can include a progress detector 270. The progress detector 270 can track a user's productivity at progressing through content. For example, the progress detector 270 can track how quickly the user is progressing through a book, a series of books or through a series of movies. For example, if the user is presented the content via the web interface 232 or the mobile interface 234, the progress detector can monitor each user session to determine how far the user progresses in the user session. If the user downloads the content to the user's client device 130-140 and reads or views the content while the client device 130-140 is not connected to the content interest system 120, the user at some point can connect the client device 130-140 to the content interest system 120 and the content interest system 120 can automatically enter data indicating how far the user has progressed and, optionally, when such reading/viewing was performed.

The progress detector 270 can analyze reading/viewing trends of each user, and generate and output corresponding analytical data. Based on the analytical data, the progress detector 270 can predict an expected time/date for the user to complete reading/viewing the content. For example, the progress detector 270 can analyze how many chapters/pages/words a user reads of a book in a certain timeframe and then predict how long it will take for the user to finish reading the book. The progress detector 270 can share the prediction with the user, thus informing the user of the user's progress or lack thereof. Moreover, the progress detector 270 can process its analytical data to determine how many hours or chapters the user should read daily to complete a book to meet a preferred timeline, which may be designated by the user or an administrator of the user's community, and then share that information with the user in real time. Thus, the progress detector 270 can drive changes on the part of the user to meet reading requirements. Optionally, the progress detector 270 can share predictions with the administrator of a user's community and/or other users in the community in real time. Thus, the administrator and each of the users can monitor, in real time, the reading or viewing progression of all of the users in the community. For example, an administrator can determine the number of users that are ahead of a reading schedule, the number of users that are on the reading schedule, and a number of users that are behind the reading schedule.

The progress detector 270 also can share predictions with a calendar/scheduler 280 of the content interest system 120. The calendar/scheduler 280 can include a notification and alerting system for reporting on calendar events. The notification and alerting system can be administrator configurable, and can be used to schedule and maintain a degree of activity synchronization for users who are collectively reading or viewing the same content. For example, the calendar/scheduler 280 can display projected times/dates when various users are expected to complete reading/viewing content, and display preferred or required completion dates set by an administrator. Further, the calendar/scheduler 280 can display rewards program timeframes, other milestones, etc. In this regard, the calendar/scheduler 280 can exchange information with various other components of the content interest system 120, such as the rewards component 268 and the progress detector 270.

For instance, the calendar/scheduler 280 can present, for each user, how many pages/chapters, or which pages/chapters, the user should read on specific days in order to meet targeted completion dates. The targeted completion dates can be set by an administrator or the user. The calendar/scheduler 280 can provide alerts to users to prompt the users to begin reading at scheduled times. Users also can provide user preferences in their respective user profiles 202 which may be accessed by the calendar/scheduler 280, and the calendar/scheduler 280 can schedule prompts to be presented to the users in accordance with the user preferences.

Various prompts also can be presented to a user to indicate to the user how other users in the user's community are proceeding at reading and/or viewing content, or to indicate to a user that the user is falling behind at keeping up with the rest of the community in reading or viewing the content. In an illustration, an administrator can schedule an expected completion time (e.g., date, time of day, etc.) by which the users in the community are to have completed reading or viewing the content. The administrator also can schedule expected completion times for various portions of the content. The progress detector 270 can monitor, for each of the users, a rate of progression of the user at reading or viewing the content. Responsive to detecting that at least one of the users is not adequately progressing, at the user's present progression rate, at reading or viewing the content to complete reading or viewing the content, or a particular portion of the content, by the expected time, the progress detector 270 can communicate an alert to the calendar/scheduler 280. In response, the calendar/scheduler 280 can generate an alert to the user to indicate to the user that the user is not adequately progressing at reading or viewing the content. The alert can serve to prompt the user to dedicate more time toward reading or viewing of the content to complete the content by the expected date.

Thus, the calendar/scheduler 280 can serve to provide the user with private and/or peer pressure to keep progressing toward completing the content. Within the calendar/scheduler 280, users can block particular days in which they plan to read a specified number of pages or chapters, or may block off certain amounts of time for reading (or viewing multimedia). The user also can specify, via the user's user profile 202, preferred periods in which alerts are presented or in which alerts are not presented to the user. An administrator also can specify, via the administrator's profile 204, preferred periods in which alerts are presented or in which alerts are not presented to the administrator.

Further, the calendar/scheduler 280 can automatically update targeted completion times for various portions of the content to be read or viewed. For example, the calendar/scheduler 280 can update a number of pages/chapters to be read by the user by a particular time, or which pages/chapters the user should read on specific days, in order to meet a targeted completion date. Moreover, if a significant portion of the users in a community are falling behind in reading, the progress detector 270 can detect such circumstances, alert community administrators, and interface with the calendar/scheduler 280 to automatically revise the targeted completion date and the volume of reading suggested to meet the targeted completion date.

In another arrangement, an administrator of the community can be provided with analytic data generated by the progress detector 270. Such analytic data can assessed by the administrator to determine reading production, schedule reading capacity, and review comparative progress of various users within a community. Moreover, the administrator can derive accurate estimates of community performance over time, which can drive better decision making pertaining to content and the optimal arrangement of events and efforts to serve the community of users. The administrator also can revise the targeted completion date and/or suggested reading volume. For example, the administrator can make decisions pertaining to early/extended termination of group reading projects, and make changes in content and/or provide alternatives for content (e.g., provide additional content for users who complete reading the original content early).

In one aspect of the present arrangements, the calendar/scheduler 280 can interface with external user calendars to track user events, note schedule conflicts, and create unique schedules for book/multimedia completion. For example, a user can link the user's personal calendar with the calendar/scheduler 280, and the personal calendar can automatically exchange calendar information with the calendar/scheduler 280. Thus, rather than accessing the content interest system 120 to access events displayed by the calendar/scheduler 280, a user can view the calendar/scheduler 280 events in the user's personal calendar. The user also can specify, via the user's user profile 202, preferred times when the calendar/scheduler 280 is to synchronize with the user's personal calendar. The user also can specify any number of other parameters regarding synchronization between the user's personal calendar and the calendar/scheduler 280. Similarly, an administrator can specify such times and other synchronization parameters via the administrator's profile 204.

Figure 3:
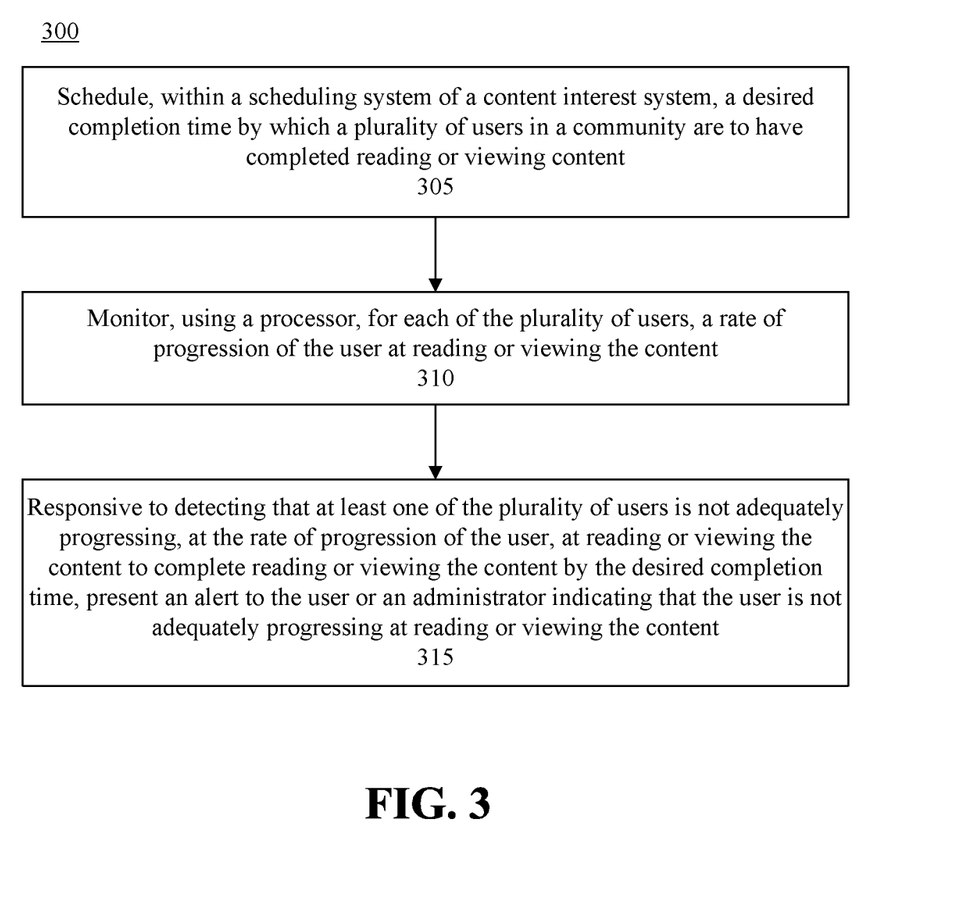
FIG. 3 is a flow chart illustrating an example of a method of presenting to a user an alert pertaining to progress of reading or viewing content.

FIG. 3 is a flow chart illustrating an example of a method 300 of presenting to a user an alert pertaining to progress of reading or viewing content. The method 300 can be implemented by the content interest system 120 of FIG. 1. At step 305, a desired completion time by which a plurality of users in a community are to have completed reading or viewing content can be scheduled within a scheduling system of the content interest system. At step 310, for each of the plurality of users, a rate of progression of the user at reading or viewing the content can be monitored. At step 315, responsive to detecting that at least one of the plurality of users is not adequately progressing, at the rate of progression of the user, at reading or viewing the content to complete reading or viewing the content by the desired completion time, an alert can be presented to the user or an administrator. The alert can indicate that the user is not adequately progressing at reading or viewing the content.

Figure 4:
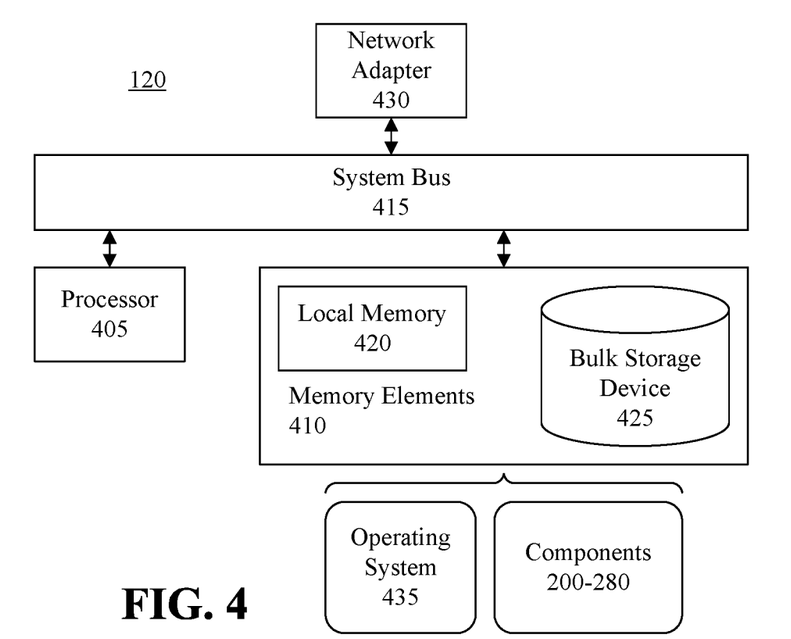
FIG. 4 is a block diagram illustrating an example architecture for a content interest system.

FIG. 4 is a block diagram illustrating an example architecture for the content interest system 120 of FIGS. 1 and 2. The content interest system 120 can include at least one processor 405 (e.g., a central processing unit) coupled to memory elements 410 through a system bus 415 or other suitable circuitry. As such, the content interest system 120 can store program code within the memory elements 410. The processor 405 can execute the program code accessed from the memory elements 410 via the system bus 415. It should be appreciated that the content interest system 120 can be implemented in the form of any system including a processor and memory that is capable of performing the functions and/or operations described within this specification that are performed by the content interest system 120. For example, the content interest system 120 can be implemented as one or more hardware servers.

The memory elements 410 can include one or more physical memory devices such as, for example, local memory 420 and one or more bulk storage devices 425. Local memory 420 refers to random access memory (RAM) or other non-persistent memory devices generally used during actual execution of the program code. The bulk storage device(s) 425 can be implemented as hard disk drives (HDD), solid state drives (SSD), or other persistent data storage devices. The content interest system 120 also can include one or more cache memories (not shown) that provide temporary storage of at least some program code in order to reduce the number of times program code must be retrieved from the bulk storage device(s) 425 during execution.

One or more network adapters 430 can be coupled to content interest system 120 to enable the content interest system 120 to become coupled to other systems, computer systems, remote printers, and/or remote storage devices through intervening private or public networks. Modems, cable modems, transceivers, and Ethernet cards are examples of different types of network adapters 430 that can be used with the content interest system 120.

As pictured in FIG. 4, the memory elements 410 can store components of the content interest system 120, for example an operating system 435 and the components 200-280 of the content interest system 120 depicted in FIG. 2. Being implemented in the form of executable program code, the operating system 435 and the components 200-206, 220-280 can be executed by the processor 405. For example, the processor 405 can execute the components 200-206, 220-280, and access the content from the content library 210, within a computing environment provided by the operating system 435 in order to perform the processes described herein that are performed by the content interest system 120.

As such, the operating system 435 and the components 200-280 can be considered part of the content interest system 120. Moreover, the operating system 435 and the components 200-280 are functional data structures that impart functionality when employed as part of the content interest system 120.

Figure 5:
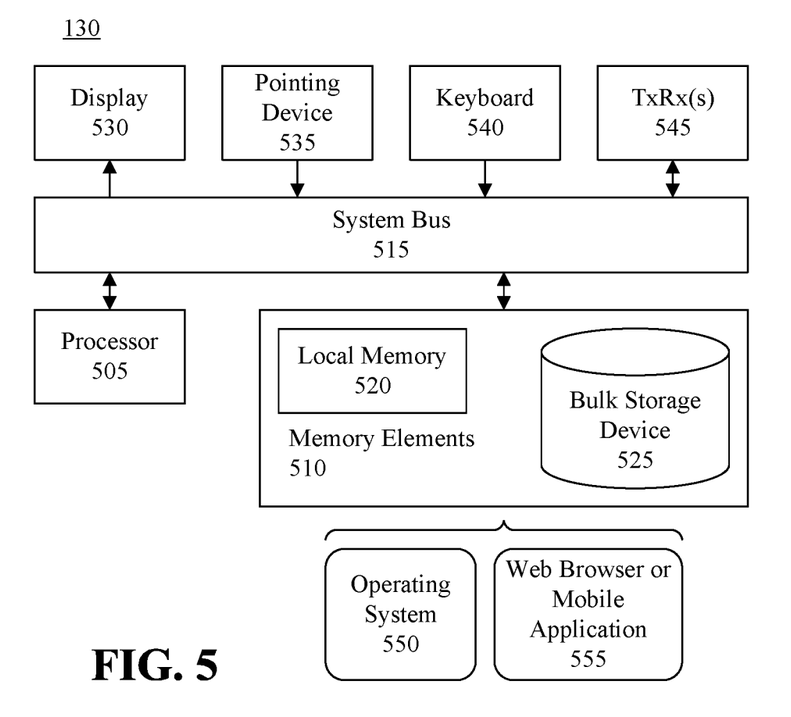
FIG. 5 is a block diagram illustrating an example architecture for a client device.

FIG. 5 is a block diagram illustrating an example architecture for the client device 130 of FIG. 1. The client devices 135, 140 can include similar architecture. The client device 130 can include at least one processor 505 (e.g., a central processing unit) coupled to memory elements 510 through a system bus 515 or other suitable circuitry. As such, the client device 130 can store program code within the memory elements 510. The processor 505 can execute the program code accessed from the memory elements 510 via the system bus 515. It should be appreciated that the client device 130 can be implemented in the form of any system including a processor and memory that is capable of performing the functions and/or operations described within this specification that are performed by the client device 130.

The memory elements 510 can include one or more physical memory devices such as, for example, local memory 520 and one or more bulk storage devices 525. The client device 130 also can include one or more cache memories (not shown) that provide temporary storage of at least some program code in order to reduce the number of times program code must be retrieved from the bulk storage device(s) 525 during execution.

Input/output (I/O) devices such as a display 530, a pointing device 535 and, optionally, a keyboard 540 can be coupled to the client device 130. The I/O devices can be coupled to the client device 130 either directly or through intervening I/O controllers. For example, the display 530 can be coupled to the client device 130 via a graphics processing unit (GPU), which may be a component of the processor 505 or a discrete device. One or more transceivers 545 also can be coupled to client device 130 to enable the client device 130 to become coupled to other systems, computer systems, remote printers, and/or remote storage devices through intervening private or public networks. Modems, cable modems, transceivers, and Ethernet cards are examples of different types of network adapters/transceivers 545 that can be used with the client device 130.

As pictured in FIG. 5, the memory elements 510 can store the components of the client device 130, for example an operating system 550 and a web browser or mobile application 555. Being implemented in the form of executable program code, the operating system 550 and the web browser or mobile application 555 can be executed by the processor 505. For example, the processor 505 can execute the web browser or mobile application 555 within a computing environment provided by the operating system 550 in order to perform the processes described herein that are performed by the client device 130 to interface with the content interest system 120. As such, the operating system 550 and the web browser or mobile application 555 can be considered part of the client device 130. Moreover, the operating system 550 and the web browser or mobile application 555 are functional data structures that impart functionality when employed as part of the client device 130.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

scheduling, within a scheduling system of a content interest system, a desired completion time by which a plurality of users in a community are to have completed reading or viewing content;

monitoring, using a processor, for each of the plurality of users, a rate of progression of the user at reading or viewing the content;

responsive to detecting that at least one of the plurality of users is not adequately progressing, at the rate of progression of the user, at reading or viewing the content to complete reading or viewing the content by the desired completion time, presenting an alert to an administrator indicating that the user is not adequately progressing at reading or viewing the content;

detecting a process initiated by a new user to join the content interest system;

responsive to detecting the process being initiated, accessing from a social media system at least one comment posted by the new user in the social media system;

identifying at least one interest of the new user by processing the at least one comment using natural language processing;

responsive to identifying the at least one interest of the user, identifying a plurality of communities that correspond to the at least one interest;

indicating to the new user the plurality of communities as communities recommended for the user to consider joining;

performing natural language processing on social media system posts by at least two of the plurality of users of the community and generating corresponding first analytical data;

determining respective interests of the at least two of the plurality of users by processing the first analytical data;

monitoring, by processing global positioning system data, a present location of the at least two of the plurality of users of the community; and responsive to determining that the at least two of the plurality of users of the community are presently located within a pre-determined distance of each other, presenting respective alerts to the at least two of the plurality of users, each alert indicating that the at least two of the plurality of users in the community are presently located within the pre-determined distance of each other, indicating a listing of content being read by the community, and indicating a shared interest of the at least two of the plurality of users.

2. The method of claim 1, further comprising:

responsive to detecting that at least one of the plurality of users is not adequately progressing, at the rate of progression of the user, at reading or viewing the content to complete reading or viewing the content by the desired completion time, updating a targeted time of the user for reading or viewing a portion of the content.

3. The method of claim 1, further comprising:

responsive to detecting that at least one of the plurality of users is not adequately progressing, at the rate of progression of the user, at reading or viewing the content to complete reading or viewing the content by the desired completion time, updating the desired completion time.

4. The method of claim 1, further comprising:

receiving, from the plurality of users in the community, feedback pertaining to the content;

processing the feedback using natural language processing to identify feedback pertaining to the content that is positive feedback and feedback pertaining to the content that is negative feedback; and responsive to identifying a first group of the users that provided the positive feedback and a second group of the users that provided the negative feedback, automatically providing a recommendation that the plurality of users in the community be split into at least two subgroups of the community, a first of the subgroups including the first group of the users that provided the positive feedback and a second of the subgroups including the second group of the users that provided the negative feedback.

5. The method of claim 1, further comprising:

responsive to detecting that at least a first of the plurality of users is adequately progressing, at the rate of progression of the first user, at reading or viewing the content to complete reading or viewing the content by the desired completion time, awarding to at least one of the plurality of users in the community at least one reward point based on the rate of progression of the first user; and presenting an award to the at least one of the plurality of users in the community based on the at least one reward point.

6. A system, comprising:

a processor programmed to initiate executable operations comprising:

scheduling, within a scheduling system of a content interest system, a desired completion time by which a plurality of users in a community are to have completed reading or viewing content;

monitoring, for each of the plurality of users, a rate of progression of the user at reading or viewing the content;

responsive to detecting that at least one of the plurality of users is not adequately progressing, at the rate of progression of the user, at reading or viewing the content to complete reading or viewing the content by the desired completion time, presenting an alert to an administrator indicating that the user is not adequately progressing at reading or viewing the content;

detecting a process initiated by a new user to join the content interest system;

responsive to detecting the process being initiated, accessing from a social media system at least one comment posted by the new user in the social media system;

identifying at least one interest of the new user by processing the at least one comment using natural language processing;

responsive to identifying the at least one interest of the user, identifying a plurality of communities that correspond to the at least one interest;

indicating to the new user the plurality of communities as communities recommended for the user to consider joining;

performing natural language processing on social media system posts by at least two of the plurality of users of the community and generating corresponding first analytical data;

determining respective interests of the at least two of the plurality of users by processing the first analytical data;

monitoring, by processing global positioning system data, a present location of the at least two of the plurality of users of the community; and responsive to determining that the at least two of the plurality of users of the community are presently located within a pre-determined distance of each other, presenting respective alerts to the at least two of the plurality of users, each alert indicating that the at least two of the plurality of users in the community are presently located within the pre-determined distance of each other, indicating a listing of content being read by the community, and indicating a shared interest of the at least two of the plurality of users.

7. The system of claim 6, the executable operations further comprising:
responsive to detecting that at least one of the plurality of users is not adequately progressing, at the rate of progression of the user, at reading or viewing the content to complete reading or viewing the content by the desired completion time, updating a targeted time of the user for reading or viewing a portion of the content.

8. The system of claim 6, the executable operations further comprising:
responsive to detecting that at least one of the plurality of users is not adequately progressing, at the rate of progression of the user, at reading or viewing the content to complete reading or viewing the content by the desired completion time, updating the desired completion time.

9. The system of claim 6, the executable operations further comprising:
receiving, from the plurality of users in the community, feedback pertaining to the content;
processing the feedback using natural language processing to identify feedback pertaining to the content that is positive feedback and feedback pertaining to the content that is negative feedback; and
responsive to identifying a first group of the users that provided the positive feedback and a second group of the users that provided the negative feedback, automatically providing a recommendation that the plurality of users in the community be split into at least two subgroups of the community, a first of the subgroups including the first group of the users that provided the positive feedback and a second of the subgroups including the second group of the users that provided the negative feedback.

10. The system of claim 6, the executable operations further comprising:
responsive to detecting that at least a first of the plurality of users is adequately progressing, at the rate of progression of the first user, at reading or viewing the content to complete reading or viewing the content by the desired completion time, awarding to at least one of the plurality of users in the community at least one reward point based on the rate of progression of the first user; and
presenting an award to the at least one of the plurality of users in the community based on the at least one reward point.

11. A computer program product comprising a computer readable storage medium having program code stored thereon, the program code executable by a processor to perform a method comprising:
scheduling, by the processor, within a scheduling system of a content interest system, a desired completion time by which a plurality of users in a community are to have completed reading or viewing content;

monitoring, by the processor, for each of the plurality of users, a rate of progression of the user at reading or viewing the content;
responsive to detecting that at least one of the plurality of users is not adequately progressing, at the rate of progression of the user, at reading or viewing the content to complete reading or viewing the content by the desired completion time, presenting, by the processor, an alert to an administrator indicating that the user is not adequately progressing at reading or viewing the content;
detecting a process initiated by a new user to join the content interest system;
responsive to detecting the process being initiated, accessing from a social media system at least one comment posted by the new user in the social media system;
identifying at least one interest of the new user by processing the at least one comment using natural language processing;
responsive to identifying the at least one interest of the user, identifying a plurality of communities that correspond to the at least one interest;
indicating to the new user the plurality of communities as communities recommended for the user to consider joining;
performing natural language processing on social media system posts by at least two of the plurality of users of the community and generating corresponding first analytical data;
determining respective interests of the at least two of the plurality of users by processing the first analytical data;
monitoring, by processing global positioning system data, a present location of the at least two of the plurality of users of the community; and
responsive to determining that the at least two of the plurality of users of the community are presently located within a pre-determined distance of each other, presenting respective alerts to the at least two of the plurality of users, each alert indicating that the at least two of the plurality of users in the community are presently located within the pre-determined distance of each other, indicating a listing of content being read by the community, and indicating a shared interest of the at least two of the plurality of users.

12. The computer program product of claim 11, the method further comprising:
responsive to detecting that at least one of the plurality of users is not adequately progressing, at the rate of progression of the user, at reading or viewing the content to complete reading or viewing the content by the desired completion time, updating a targeted time of the user for reading or viewing a portion of the content.

13. The computer program product of claim 11, the method further comprising:
responsive to detecting that at least one of the plurality of users is not adequately progressing, at the rate of progression of the user, at reading or viewing the content to complete reading or viewing the content by the desired completion time, updating the desired completion time.

14. The computer program product of claim 11, the method further comprising:
receiving, from the plurality of users in the community, feedback pertaining to the content;
processing the feedback using natural language processing to identify feedback pertaining to the content that is positive feedback and feedback pertaining to the content that is negative feedback; and responsive to identifying a first group of the users that provided the positive feedback and a second group of the users that provided the negative feedback, automatically providing a recommendation that the plurality of users in the community be split into at least two subgroups of the community, a first of the subgroups including the first group of the users that provided the positive feedback and a second of the subgroups including the second group of the users that provided the negative feedback.

15. The computer program product of claim 11, the method further comprising:

responsive to detecting that at least a first of the plurality of users is adequately progressing, at the rate of progression of the first user, at reading or viewing the content to complete reading or viewing the content by the desired completion time, awarding to at least one of the plurality of users in the community at least one reward point based on the rate of progression of the first user; and presenting an award to at least one of the plurality of users in the community based on the at least one reward point.

* * * * *